UNITED STATES PATENT OFFICE.

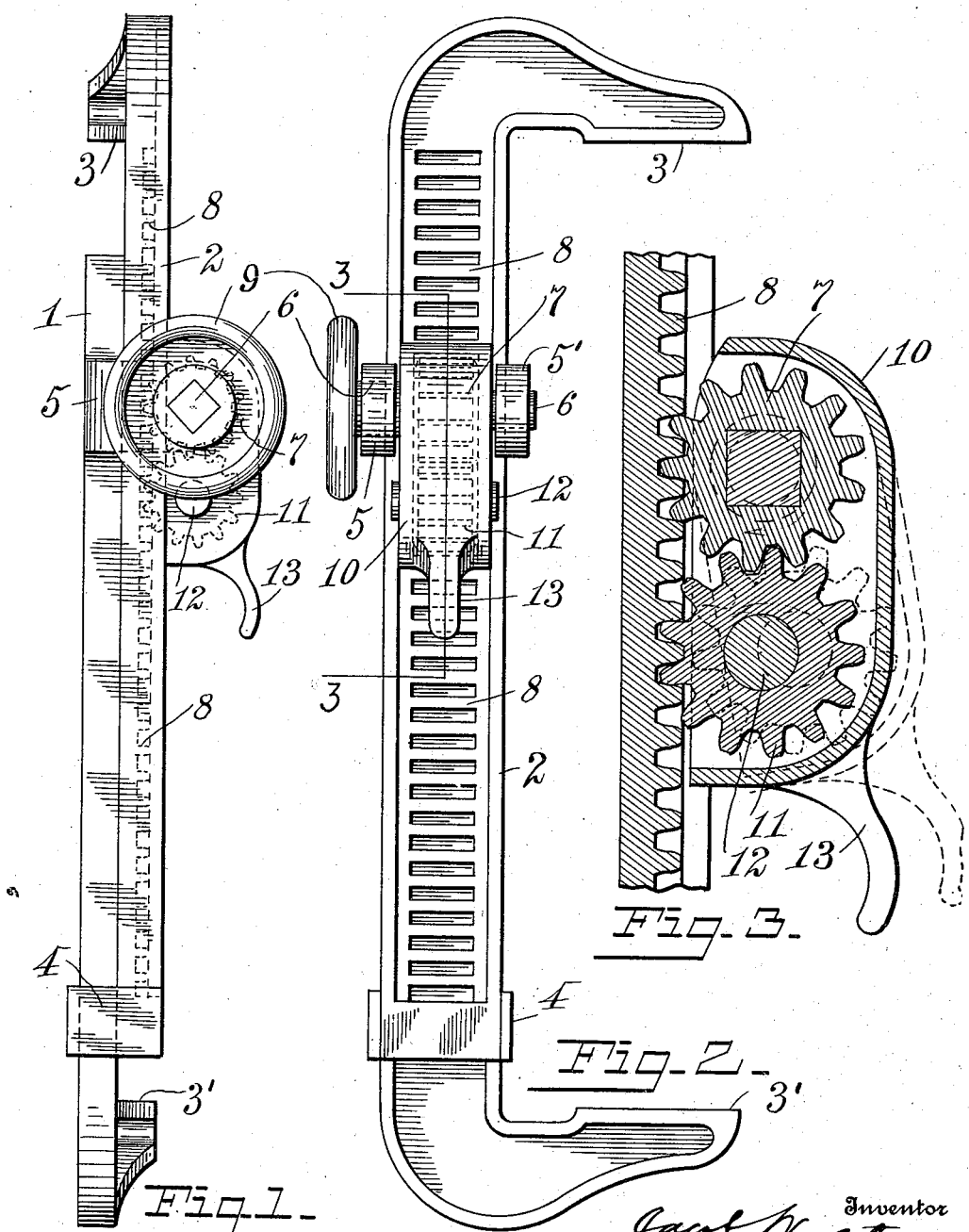

JACOB WALTHER, OF DAYTON, OHIO, ASSIGNOR TO THE DAYTON STEEL FOUNDRY COMPANY, OF DAYTON, OHIO, A CORPORATION OF OHIO.

ADJUSTING AND LIFTING MEANS.

1,218,021.  Specification of Letters Patent.  Patented Mar. 6, 1917.

Application filed December 1, 1916. Serial No. 134,240.

*To all whom it may concern:*

Be it known that I, JACOB WALTHER, a citizen of the United States, residing at Dayton, in the county of Montgomery and State of Ohio, have invented certain new and useful Improvements in Adjusting and Lifting Means; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in means for locking any work device in which an adjustment of said device to different positions is required and consists of a rack and pinion movement and means for locking the rack in adjusted positions. The invention is applicable to work clamps, lifting jacks, wire stretchers, and kindred appliances where adjustments are necessary and means are required for holding the device in any position to which it may be adjusted.

The accompanying drawings illustrate my improvements applied to a working clamp in which boards, flasks or other parts may be tightened and held firmly together. The invention is not limited to any particular work to be done and in which an adjustment is necessary, but it essentially embraces a means for adjusting and locking through the action of a rack and pinion the device at any and all points in utilizing the same for various purposes. In the accompanying drawings, Figure 1 is a vertical longitudinal elevation of my improvements applied to clamping members between which may be held boards, flasks or other parts which it is necessary to hold fast together; Fig. 2 is an elevation of the device looking on Fig. 1 from the right; and Fig. 3 is an enlarged sectional view of a portion of the rack and the two pinions on the line 3—3 of Fig. 2.

In a detail description of the invention, similar reference characters or numerals indicate corresponding parts in the drawing.

Referring more particularly to the drawings, 1 and 2 designate two bars placed one against the other and one of which is adjustable longitudinally with reference to the other to lengthen or shorten the distance of the same from end to end. Projecting laterally from the ends of these bars are clamping arms 3 and 3' between which any work or device may be rigidly clamped and held. The bar 1 constitutes the base member and upon this the other member 2 slides longitudinally when moved to lengthen or shorten the distances between the clamping ends 3 and 3'. The bar 2 is provided with teeth 8 on one side thereof and one end of said bar 2 is provided with a keeper or band 4 which incloses the bar 1 and maintains the two bars in sliding contact one with the other. The base bar 1 has two side projections 5—5' extending outwardly from it which inclose the sides of the shifting bar 2 which is also maintained in operative relation with the bar 1 by means thereof. The projections 5—5' have alined openings therein to receive the ends of a shaft 6 which supports an adjusting gear 7 that meshes with the teeth of the shifting bar 2. The shaft 6 may be rotated to project or retract the bar 2 by means of a lever fixed to an end thereof or any suitable means such as a hand wheel 9. By turning this hand wheel, the said bar 2 may be extended or contracted as the work conditions require to lengthen or shorten the distances between the clamping arms 3 and 3'. To whatever position the bar 2 is moved, it is held firmly therein by means of a locking gear 11 which is of the same diameter as the adjusting gear 7 and meshes therewith. The gear 7 engages the teeth 8 of bar 2, and when the necessary adjustment is to be imparted to the bar 2 it is done by rotating said gear 7. The locking gear 11 is mounted on a shaft 12 which is supported in the side walls of a casing or cover 10 which covers the gears and is pivotally supported on the shaft 6 of the adjusting gear 7. The casing 10 may be swung inwardly to engage or outwardly to disengage the teeth 8 of bar 2 by means of a handle portion 13 projecting therefrom. The gear 11 always remains in mesh with the adjusting gear 7. When out of mesh with the rack teeth 8 it rotates idly when the adjusting gear 7 is operated and when in mesh with the teeth 8 it locks the adjusting gear 7. In Fig. 3, the dotted position shows the extent of movement necessary to be given the cover 10 to disengage the locking gear 11 from the teeth 8. This movement of said locking gear 11 is given it when movement is to be given the bar 2 to lengthen or shorten its distance from the remote end of bar 1. After this adjustment is imparted to said bar 2, the locking gear 11 is dropped into the teeth 8 to hold the bar 2 in the position to which it has been moved. The engagement of the gear 11 takes place without materially affecting the position to which bar 2 has been moved for the reason that the two gears 7 and 11 are of comparatively small diameters and have a clearance or play that is sufficient to compensate for any tangential difference between the pitch line of their circle and the straight pitch line of the teeth of bar 2.

It is obvious that this adjusting and locking means may be utilized for a variety of purposes. For example, it may be employed as means for adjusting and holding the supporting standard of a lifting jack in which case the bar 1 may have a base support and the bar 2 may have a suitable engaging head or arm in place of the clamping end 3, and in the case of the application of the invention to the purpose of a wire stretcher, suitable terminals may be employed on the remote ends of the bars 1 and 2 for engaging the wire. These modifications do not involve any departure from the adjusting and locking features of my improvements. I, therefore, do not desire to limit myself to the application of these features to the specific form of clamping members shown and described herein.

Having described my invention and the uses and purposes thereof, I desire to claim.

1. The combination with two members one of which is longitudinally adjustable relative to the other and provided with teeth in a side thereof, of an adjusting gear in mesh with said teeth and by means of which the distance between the ends of said members may be increased or decreased, a locking gear in permanent mesh with said adjusting gear and pivotally supported relative to said teeth of the adjustable member, said locking gear being adapted to disengage and engage said teeth of said adjustable member to permit adjustment thereof and to engage said teeth to lock the same in adjusted positions, substantially as specified.

2. The combination with two longitudinally adjustable members one of which is provided with transverse gear teeth, of an adjusting gear in mesh with said teeth, a locking gear pivotally supported adjacent to the adjusting gear and adapted to mesh or unmesh with said teeth, and a supporting member for said locking gear pivotally mounted upon the axis of the adjusting gear and whereby said locking gear may be swung out of mesh with the teeth of said adjustable member to permit adjustment thereof and swung into mesh with said teeth to lock said member in its adjusted position.

3. The combination with longitudinally adjustable members one of which is provided with transverse gear teeth, of an adjusting gear supported on the other of said members and meshing with said teeth, a locking gear pivoted upon an axis in alinement with the axis of said adjusting gear, and a swinging support for said locking gear having an axis coinciding with the axis of the adjusting gear whereby said locking gear may be swung in and out of mesh with the teeth of said longitudinally adjustable member.

In testimony whereof I affix my signature, in presence of two witnesses.

JACOB WALTHER.

Witnesses:
R. J. McCarty,
Matthew Siebler.

Copies of this patent may be obtained for five cents each, by addressing the "Commissioner of Patents, Washington, D. C."